United States Patent [19]
Nishiyama

[11] Patent Number: 5,209,314
[45] Date of Patent: May 11, 1993

[54] RIDING-TYPE WORKING MACHINE
[75] Inventor: Kimito Nishiyama, Saitama, Japan
[73] Assignee: Honda Giken Kogyo Kabushiki Kaisha, Tokyo, Japan
[21] Appl. No.: 727,452
[22] Filed: Jul. 9, 1991
[30] Foreign Application Priority Data
  Jul. 9, 1990 [JP]  Japan .................. 2-181118
[51] Int. Cl.$^5$ .............................. B60K 11/04
[52] U.S. Cl. ...................... 180/68.6; 180/79; 180/900
[58] Field of Search ......... 180/68.4, 68.6, 79, 180/79.3, 900; 56/14.7, DIG. 6

[56] References Cited
U.S. PATENT DOCUMENTS

| 3,319,732 | 5/1967 | Soeteber et al. | 180/54.1 |
| 4,081,050 | 3/1978 | Hennessey et al. | 180/54.1 |
| 4,687,069 | 8/1987 | Inomata et al. | 180/68.4 X |
| 4,744,433 | 5/1988 | Takeuchi et al. | 180/68.4 |
| 5,042,604 | 8/1991 | Tone et al. | 180/68.4 |

FOREIGN PATENT DOCUMENTS 59-70227 4/1984 Japan.
59-10249 7/1984 Japan.

Primary Examiner—Margaret A. Focarino
Assistant Examiner—Michael Mar
Attorney, Agent, or Firm—Howard L. Rose

[57] ABSTRACT

A riding-type working machine includes a machine frame defining an engine compartment in a front portion thereof, an engine mounted in the engine compartment, a steering column in the form of a framework vertically mounted on the machine frame behind said engine, and a radiator mechanism for cooling the engine, the radiator mechanism being disposed in the steering column.

10 Claims, 6 Drawing Sheets

RIDING-TYPE WORKING MACHINE

BACKGROUND OF THE INVENTION

1. Field of the Invention

The present invention relates to a riding-type working machine such as a riding-type lawn mower, for example.

2. Description of the Prior Art

Riding-type working machines such as riding-type lawn mowers generally have a radiator and a cooling fan which are positioned in front of the engine mounted in a front portion of the machine frame.

In order to prevent hot air from flowing toward the driver's seat, a radiator and a cooling fan may be positioned behind the engine so that the engine and the radiator will be forcibly cooled by air that is introduced from the side of the driver's seat.

A steering column is vertically disposed in front of the driver's seat centrally in the transverse direction of the machine frame, the steering column being usually in the shape of a truncated cone. To introduce a large amount of cooling air, the radiator and the cooling fan are sufficiently spaced from the steering column in front thereof, or are positioned laterally of the steering column.

With the radiator and the cooling fan positioned in front of the steering column in spaced relationship, an engine compartment defined by the engine hood is too long forwardly, making it difficult for the driver to have good front visibility and to make smaller turns, and also join various other working machines to the front end of the machine frame.

The radiator and the cooling fan which are positioned laterally of the steering column increase the width of the engine hood, affecting visibility of the front wheels and surroundings thereof, so that the driver may not efficiently work with the machine.

One conventional riding-type working machine has a steering gearbox mounted on the machine frame and a steering column mounted on the steering gearbox. Since the steering gearbox is coupled to the machine frame by bolts and nuts and the steering column is also coupled to the steering gearbox by bolts and nuts, many fastening elements, i.e., bolts and nuts, are required and the process of coupling those components is complex. Inasmuch as the steering gearbox is in the form of a casting, the bolts tend to work loose because of the difference in hardness between the steering gearbox and the machine frame and the steering column which are typically made of sheet steel. Another problem is that large loads applied from the steering handle may be transmitted through the steering column to the steering gearbox.

SUMMARY OF THE INVENTION

In view of the aforesaid shortcomings of the conventional riding-type working machines, it is an object of the present invention to provide a riding-type working machine which introduces air from the side of a driver's seat to forcibly cool an engine and a radiator, thus preventing hot air from flowing toward the driver's seat, and which also reduce the length and width of an engine compartment defined by an engine hood, thereby achieving high visibility of the front area and front wheels of the machine, improving the ability of the machine to make smaller turns, and allowing other working machines to be coupled easily to the front end of the machine.

Another object of the present invention is to provide a riding-type working machine which has a reduced number of fastening elements with which a steering gearbox and a steering column are coupled, so that these components can easily be coupled, and which prevent fastening bolts from working loose, thereby achieving a mechanically strong structure by which the steering column is fixed in position.

According to the present invention, there is provided a riding-type working machine comprising a machine frame, the machine frame defining an engine compartment in a front portion thereof, an engine mounted in the engine compartment, a steering column in the form of a framework vertically mounted on the machine frame behind the engine, and a radiator mechanism for cooling the engine, the radiator mechanism being disposed in the steering column.

The riding-type working machine further includes a steering gearbox fixedly mounted on the machine frame, the steering column comprising a bent pipe framework having an upper section, a side section extending downwardly from the upper section, and a bottom section extending downwardly from the side section and joined to the steering gearbox.

The riding-type working machine further includes a dual structure comprising a plurality or bolt-like support members having lower ends fixed to the machine frame and extending through the steering gearbox, an upper flat member interconnecting upper ends of at least two of the bolt-like support members, the steering gearbox serving as a lower flat member, and support pipes interposed between the upper and lower flat members, the bolt-like support members extending through the support pipes, respectively, the bottom section being joined to the support pipes.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
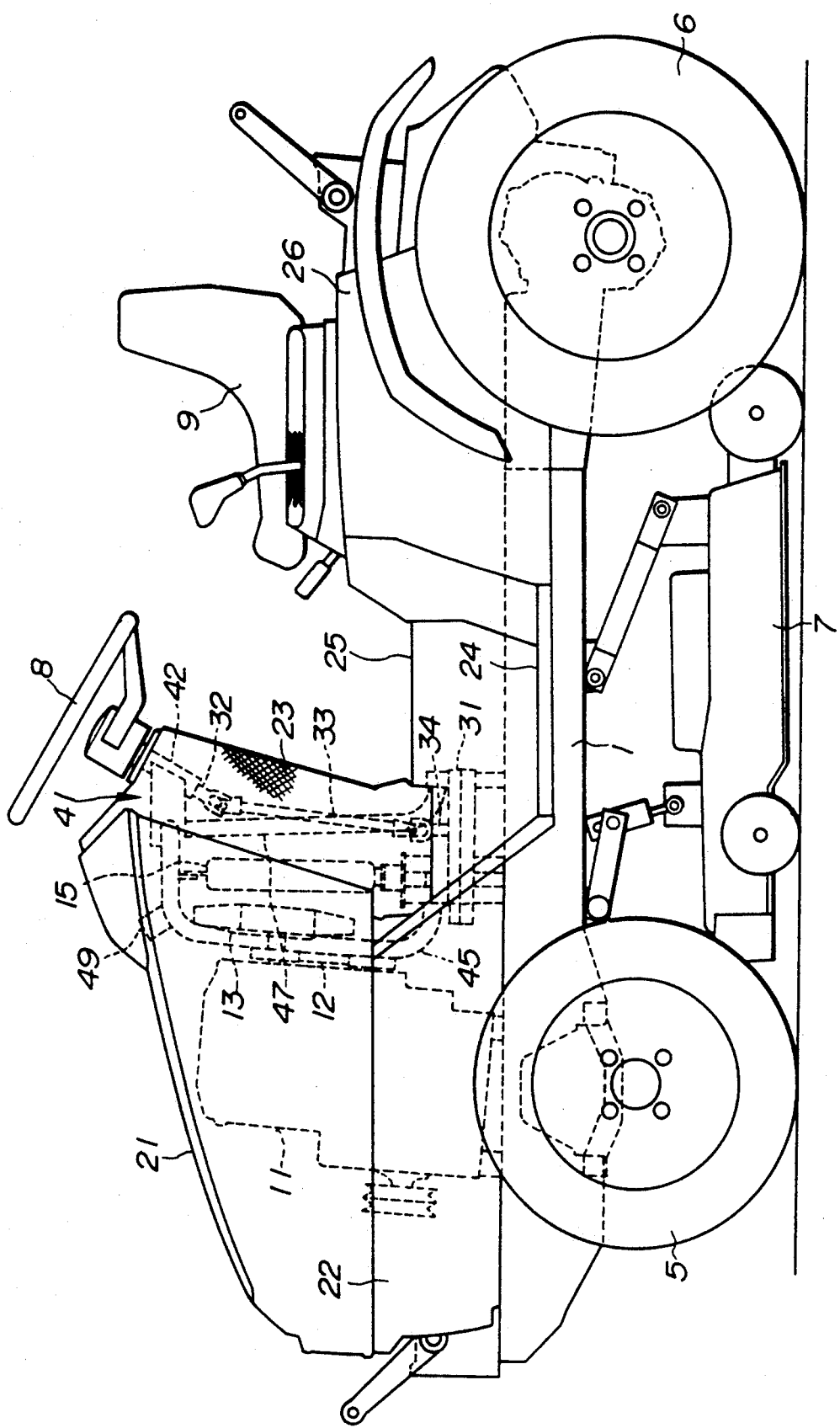
FIG. 1 is a schematic side elevational view of a riding-type lawn mower as a riding-type working machine according to the present invention.

FIG. 1 shows a riding-type lawn mower as a riding-type working machine according to the present invention. The riding-type lawn mower comprises a pair of front wheels 5 one on each side of a machine frame 1 at a front portion thereof, a pair of rear wheels 6 one on each side of the machine frame 1 at a rear potion thereof, a cutter deck 7 disposed below a central area of the machine frame 1, and an engine 11 mounted on the front portion of the machine frame 1. A cooling fan 13 is disposed behind the engine 11 and operatively connected thereto by a belt-and pully mechanism 12.

Figure 2:
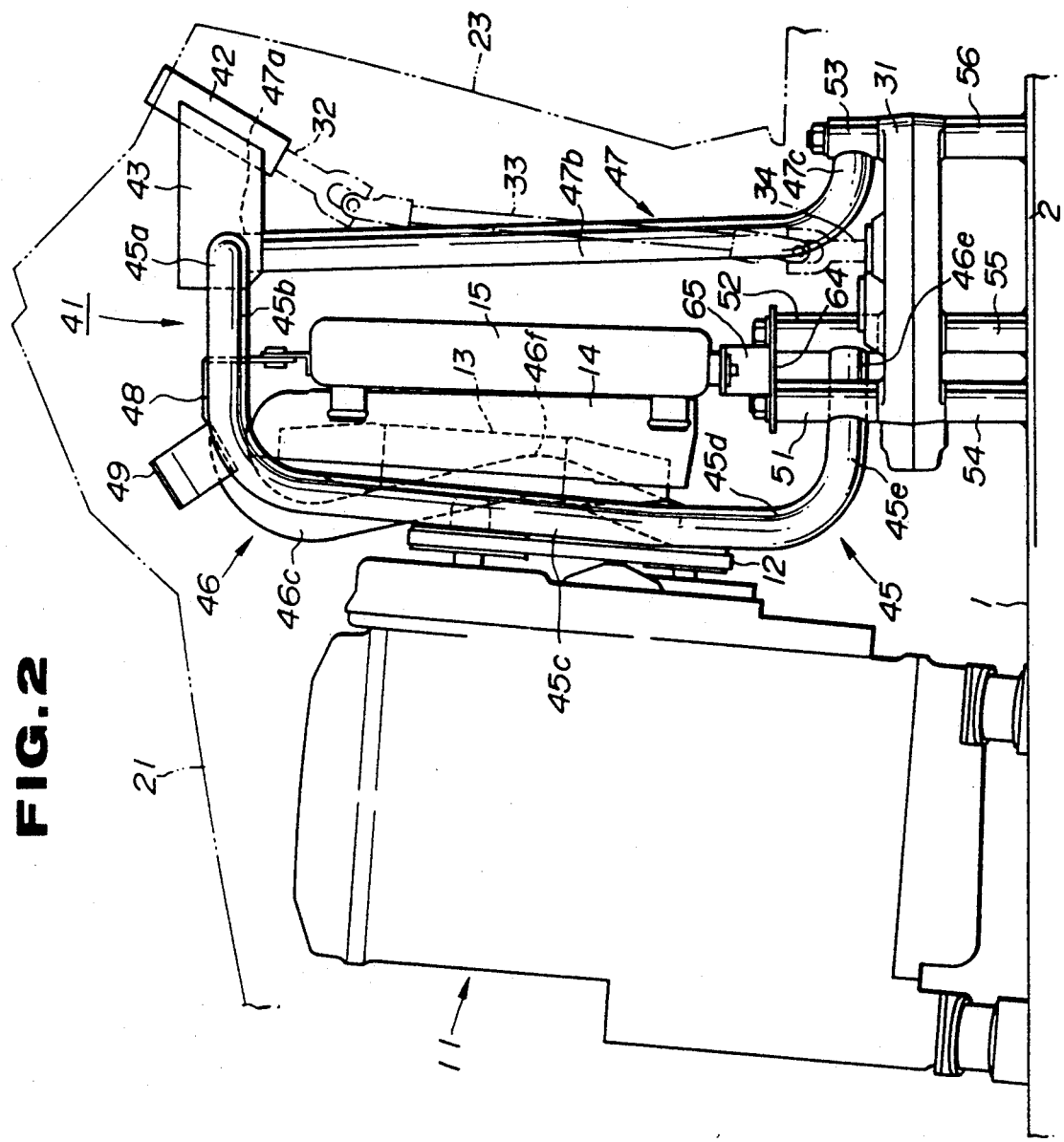
FIG. 2 is an enlarged fragmentary side elevational view of a steering column and nearby components of the riding-type lawn mower shown in FIG. 1.
Figure 3:
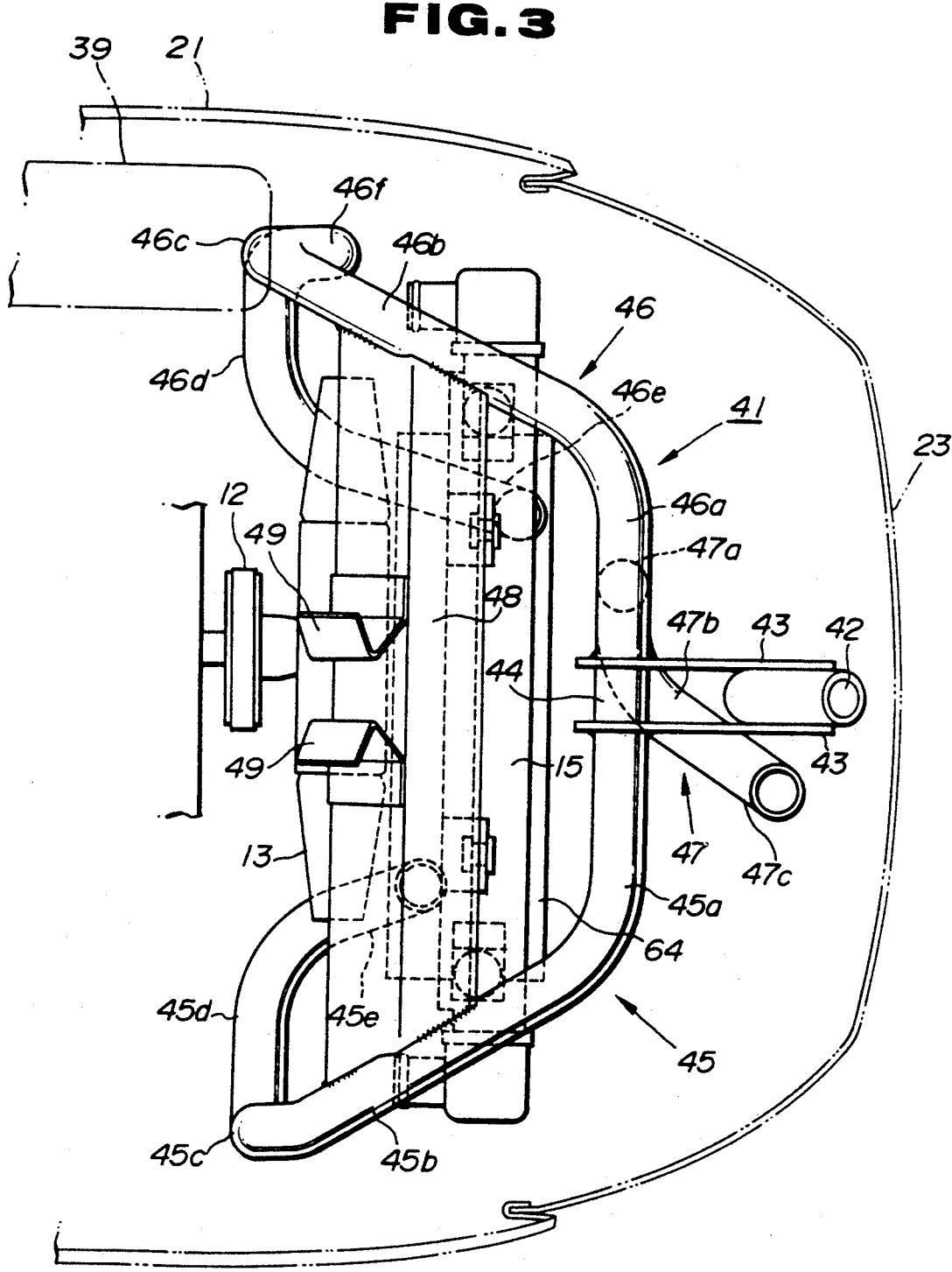
FIG. 3 is a plan view of the steering column and components shown in FIG. 2.

As shown in FIGS. 2 and 3, the cooling fan 13 is surrounded by a shroud 14. The shroud 14 is followed by a radiator 15 positioned therebehind, and a relatively flat steering gearbox 31 is disposed beneath the radiator 15. To the steering gearbox 31, there is connected a steering wheel 8 through upper, middle, and lower steering shafts 32, 33, 34 that are coupled by universal joints.

The engine 11 is housed in an engine compartment that is defined by an engine hood 21, an apron 22, and a steering column cover 23. The riding-type lawn mower includes a pair of laterally spaced floors 24 and a central tunnel 25 that are positioned behind the engine compartment. A driver's seat 9 is mounted on a rear cover 26 which is positioned behind the floors 24 and the central tunnel 25 and covers the rear portion of the machine frame 1. The steering column cover 23 is made of a resin mesh through which air can be introduced into the engine compartment by the cooling fan 13.

A steering column 41 in the form of a pipe framework is vertically mounted on the steering gearbox 31. The steering column 41 defines part of a rear partition of the engine compartment.

Figure 4:
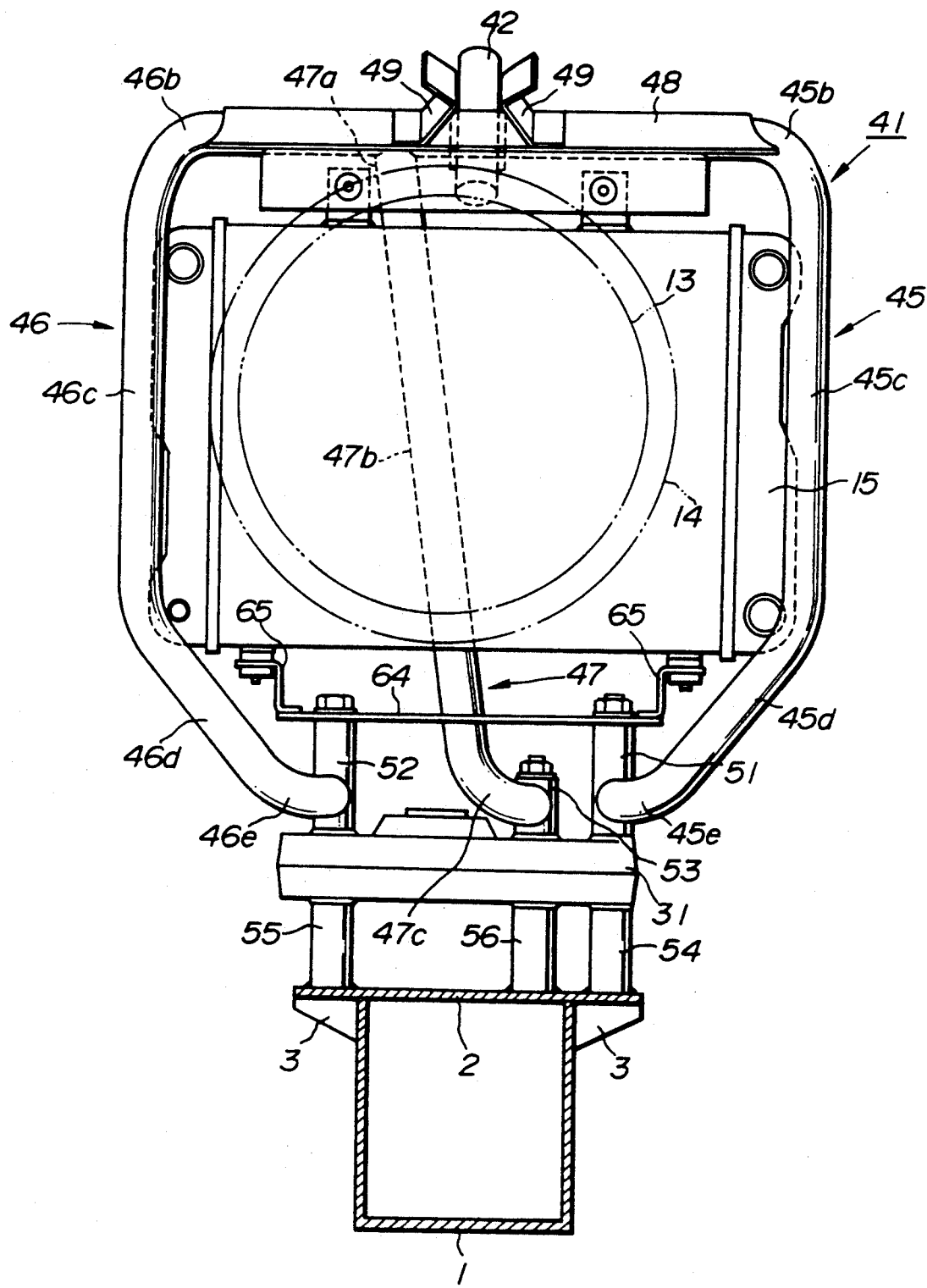
FIG. 4 is a front elevational view of the steering column and components shown in FIG. 2.

As shown in FIGS. 3 and 4, the steering column 41 comprises a steering shaft support pipe 42, a pair of laterally spaced plates 43 joined to and extending forwardly from the steering shaft support pipe 42, a cross pipe 44, a lefthand column frame pipe 45 joined to a front end of the lefthand plate 43, a righthand column frame pipe 46 joined to a front end of the righthand plate 43, and a central column frame pipe 47 joined to an upper portion of the righthand column frame pipe 46. The upper steering shaft 32 to which the steering wheel 8 is coupled extends through and is supported by the steering shaft support pipe 42, and extends substantially vertically into the pipe framework of the steering column 4.

The lefthand and righthand column frame pipes 45, 46 are of a bent configuration, and have upper horizontal portions 45a, 45b, respectively, joined to the plates 43 and extending outwardly therefrom, upper inclined portions 45b, 46b, respectively, extending obliquely forwardly and outwardly from the upper horizontal portions 45a, 45b, vertical portions 45c, 46c, respectively, extending downwardly from the distal ends of the upper inclined portions 45b, 46b, lower horizontal portions 45d, 46d, respectively, extending inwardly from the distal ends of the vertical portions 45c, 46c, and lower inclined portions 45e, 46e extending rearwardly and inwardly from the inner ends of the lower horizontal portions 45d, 46d.

In the illustrated embodiment, the lower inclined portion 46e of the righthand column frame pipe 46 extends more rearwardly than the lower inclined portion 45e of the lefthand column frame pipe 45. The vertical portion 46c of the righthand column frame pipe 46 has a rearwardly bent potion 46f extending out of physical interference with a rear end of a muffler 39 connected to the engine 11.

The central column frame pipe 47 has an inclined portion 47b extending obliquely downwardly out of physical interference with the steering shafts from an upper end 47a thereof that is joined to a lower surface of the upper horizontal portion 46a of the righthand column frame pipe 46. The central column frame pipe 47 also has a lower inclined portion 47c extending obliquely rearwardly to the left from the lower end of the inclined portion 47b.

An upper plate 48 is joined to and extends between the upper inclined portions 45b, 46b of the lefthand and righthand column frame pipes 45, 46. Engine hood catches 49 are mounted centrally on the upper plate 48.

Vertical joint pipes 51, 52, 53 are coupled respectively to the distal ends of the lower inclined portions 45e, 46e, 47c, respectively, of the lefthand, righthand, and central column frame pipes 45, 46, 47. The vertical joint pipes 51, 52 are of the same length as each other, but the vertical joint pipe 53 is shorter than the vertical pipes 51, 52. The vertical joint pipes 51, 52, 53 constitute part of a dual structure by which the steering column 41 is fixed to the machine frame 1.

The steering column 41 is composed of the three column frame pipes 45, 46, 47, as described above. The upper horizontal portions 45a, 46a, the upper inclined portions 45b, 46b, and the cross pipe 44 jointly serve as an upper section of the steering column 41. The vertical portions 45c, 46c and the inclined portion 47b jointly serve as a side section of the steering column 41. The distal ends of the lower inclined portions 45e, 46e, 47c, which are joined to the vertical pipes 51, 52, 53, jointly serve as a bottom section of the steering column 41. The horizontal cross-sectional area of the side section of the steering column 41 is greater than the area of the bottom section thereof. Therefore, the steering column 41 is large enough to accommodate therein a radiator mechanism which is composed of the cooling fan 13 and the radiator 15, but has a small area through which it is joined to the machine frame 1. Thus, the steering column 41 can be fixedly mounted on a limited upper surface of the steering gearbox 31. The steering column 41 is not limited to the illustrate structure, but may be composed of more than three column frame pipes.

Figure 5:
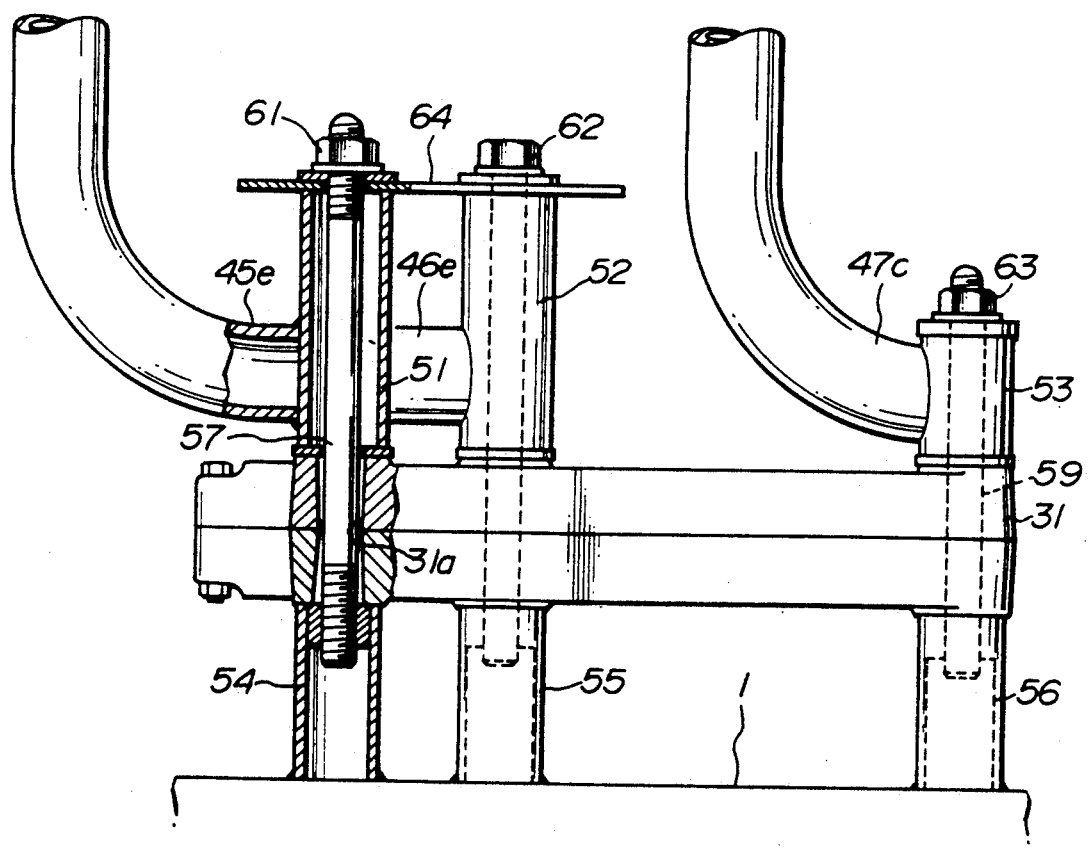
FIG. 5 is an enlarged fragmentary side elevational view showing a structure by which the steering column is fixed to a machine frame.

As shown in FIG. 5, the vertical pipes 51, 52, 53 are positioned on the upper surface of the steering gearbox 31, and three support pipes 54, 55, 56 are vertically mounted on the machine frame 1 underneath the steering gearbox 31 in vertical alignment with the vertical pipes 51, 52, 53, respectively. Stud bolts 57, 59 are vertically mounted respectively on the lefthand and central rear support pipes 54, 56, and a bolt 62 is threaded into the righthand support pipe 55. The steering gearbox 51 is in the form of a casting, and has three bolt holes 31a defined therein through which the bolts 57, 59, 62 extend vertically. The support pipes 54, 55, 56 are vertically mounted on an upper panel 2 of the machine frame 1, which is of a box-shaped cross section, the upper panel 2 being partly stiffened by reinforcing members 3.

The stud bolts 57, 59 extend respectively through the bolt holes 31a and the vertical pipes 51, 53, and nuts 61, 63 are threaded over the upper ends of the stud bolts 57, 59, respectively. The bolt 62 extends through the bolt hole 31a and the vertical pipe 52, and is threaded into the support pipe 55. The steering gearbox 31 and the steering column 41 are thus joined to the machine frame 1.

Figure 6:
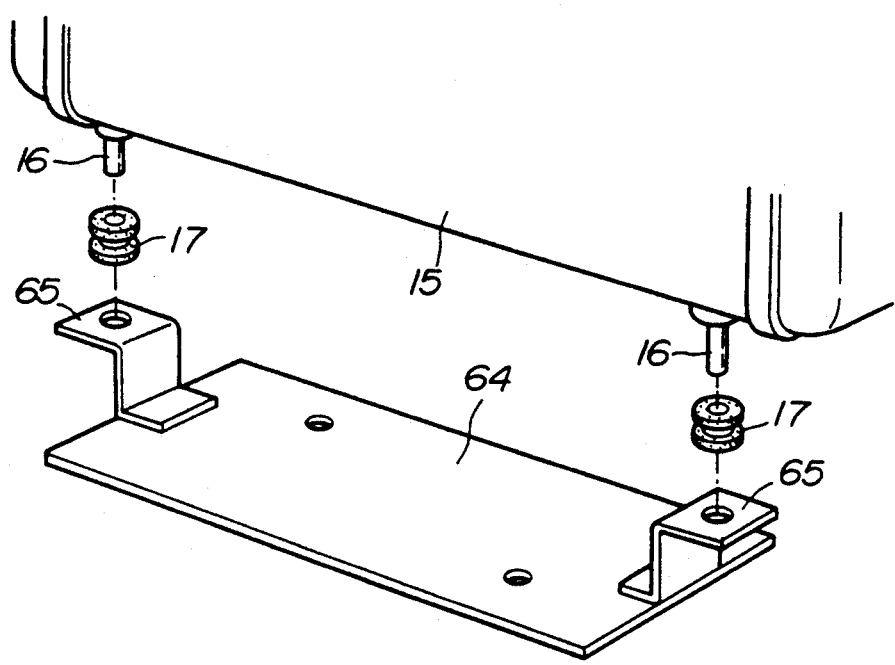
FIG. 6 is an exploded perspective view of a structure by which a lower portion of a radiator of the riding-type lawn mower is supported on the machine frame.
Figure 7:
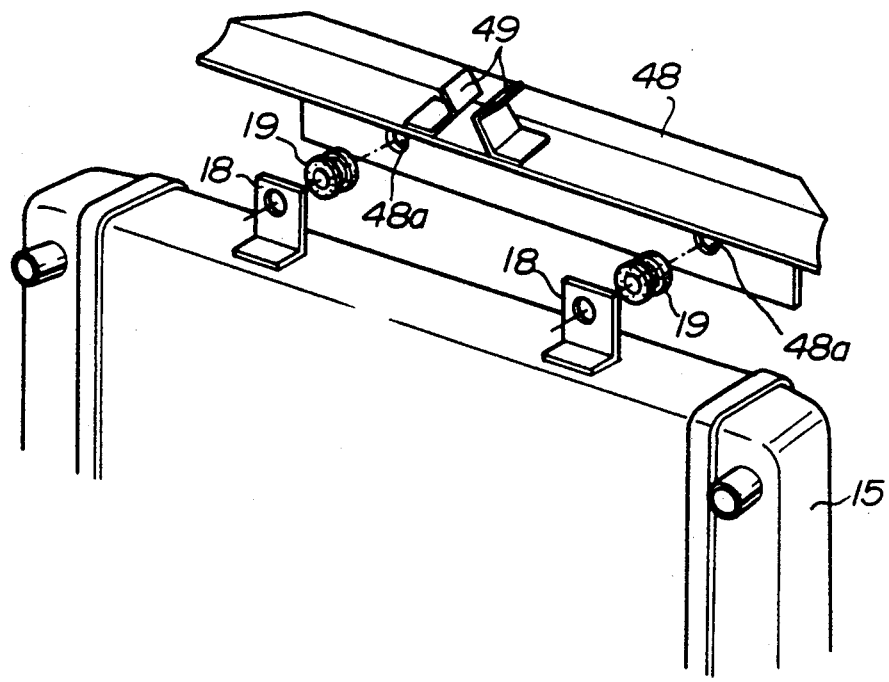
FIG. 7 is an exploded perspective view of a structure by which an upper portion of the radiator is supported on the steering column.

A base plate 64 is fastened to the upper ends of the vertical pipes 51, 52 by the nut 61 and the bolt 62. As shown in FIG. 6, the base plate 64 supports radiator support stays 65 on its lateral ends. The radiator 15 has a pair of joint pins 16 on its lateral lower surfaces, the joint pins 16 being mounted respectively on the radiator support stays 65 through rubber bushings 17. As shown in FIG. 17, the radiator 15 has a pair of attachment stays 18 on its lateral upper surfaces, and these attachment stays 18 are fastened to attachment holes 48a, respectively, defined in lateral lower ends of the upper plate 48 through rubber bushings 19 with bolts and nuts.

As described above, the steering column 41 is coupled to the machine frame 1 by the steering gear box 31, which serve as a lower flat member, the support pipes 54, 55, 56 and the bolts 57, 59, 62, which jointly serve as support bolt members, having lower ends fixed to the machine frame 1 and extending through the steering gearbox 31, the base plate 62, which serves as an upper flat member, and the vertical pipes 51, 52, 53 interposed between the upper and lower flat members and through which the support bolt members extend, these members making up the dual structure referred to above. Since the distal ends of the lower portions 45e, 46e, 47c of the column frame pipe 41 are joined to the support bolt members of the dual structure, the steering column 41 is coupled to the machine frame 1 with a highly mechanically strong structure.

The cooling fan 13 and the radiator 15 are disposed within the steering column 41. Air is introduced into the engine compartment from the rear driver's seat 9 through the resin-mesh steering column cover 23 by the cooling fan 13, so that the radiator 15 and the engine 11 are forcibly cooled by the introduced air. Therefore, no hot air flows from the steering column cover 23 toward the driver's seat 9.

The steering column 41 has the support pipe 42 which supports the upper steering shaft 32 coupled to the steering wheel 8. The steering column 41 is rendered highly rigid by the lefthand, righthand, and central column frame pipes 45, 46, 47, and is of a Rahmen structure which is highly resistant to stresses as the applied stresses are distributed to those column frame pipes. The cooling fan 13 and the radiator 15 are disposed in the steering column 41 closely to and in front of the steering shafts 32, 33, 34. The steering column 41 makes the engine compartment smaller in entire length and width than the conventional arrangement in which the radiator and the cooling fan are disposed in front of or laterally of the steering column in the shape of a truncated cone.

Accordingly, the entire length and width of the engine compartment which is defined by the engine hood 21 and other components are reduced for good visibility of the area in front of the engine hood 21 and the front wheels 5. The riding-type lawn mower can also make smaller turns, and other working machines can easily be connected to the front end of the machine frame 1.

The present invention is not limited to the illustrated riding-type lawn mower, but may be applied to other riding-type working machines such as tractors for agricultural use. If the engine compartment is of the fully closed type, the cooling fan ma be located in front of the engine.

The dual structure allows the steering gearbox 31 and the steering column 41 fastened together to the machine frame 1, thereby reducing the number of fastening elements and simplifying the process of fastening the above components to the machine frame 1. When the steering column 41 is to be fastened to the steering gearbox 31 on the machine frame 1, the support pipes 54, 55, 56 on the machine frame 1 and the vertical pipes 51, 52, 53 at the lower ends of the steering column 41 are joined together by the stud bolts 57, 59, the nuts 61, 63, and the bolt 62. Since the steering gearbox 41, which is in the form of a casting, is not directly joined to the machine frame 1 or the steering column 41 by bolts and nuts, the bolts are prevented from working loose due to different hardnesses of the materials of the components fastened together. Large loads applied from the steering wheel 8 through the steering column 41 are reliably borne by the machine frame 1, thus providing a high mechanical strength with which the steering column 41 is supported.

With the above dual structure, the mechanical strength with which the steering column 41 is supported is also considerably increased by the base plate 64, or the upper flat member, which is joined to and extends between the vertical pipes 51, 52 of the laterally spaced column frame pipes 45, 46.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

I claim:

1. A riding-type working machine comprising:
   a machine frame, said machine frame defining an engine compartment in a front portion thereof;
   an engine mounted in said engine compartment;
   a steering column in the form of a framework defining a space therein, said steering column being vertically mounted on said machine frame behind said engine;
   a steering shaft disposed within said space in the steering column and secured to an upper end of said steering column,
   a steering wheel,
   a radiator for cooling said engine, said radiator being disposed within said space in the steering column;
   a steering gearbox,
   support means for fixedly mounting said steering gearbox horizontally on said machine frame under said radiator and steering column,
   said steering shaft extending from said steering wheel into said steering gear box,
   a lower end of said steering column being fixedly secured to said support means, and
   means for securing and supporting a lower end of said radiator to said support means.

2. A riding-type working machine according to claim 1, wherein a side section of the steering column has a larger horizontal cross-sectional area than the area of a bottom section, thereby allowing said radiator to be accommodated in said steering column.

3. A riding-type working machine according to claim 1, said steering column including a dual structure comprising a plurality of bolt-like support members having lower ends fixed to said machine frame and extending through said steering gearbox, an upper flat member interconnecting upper ends of at least two of said bolt-like support members, said steering gearbox serving as a lower flat member, and support pipes interposed between said upper and lower flat members, said bolt-like support members extending through said support pipes, respectively, said bottom section being joined to said support plates.

4. A riding-type working machine comprising:
a machine frame, said machine frame defining an engine compartment in a front portion thereof;
an engine mounted in said engine compartment;
a steering column providing a rear partition of said engine compartment;
a steering shaft mounted in and vertically extending through said steering column and secured to an upper end of said steering column;
a radiator for cooling said engine,
a fan located between said engine and said radiator for drawing cooling air through said radiator and blowing it over said engine,
a shroud disposed about said fan,
a steering gearbox,
said steering column being in the form of a framework defining a space therein, said radiator and fan being disposed in said space in the steering column,
support means for fixedly mounting said steering gearbox on said machine frame generally horizontally below and under said radiator, fan and said steering column for thereby reducing at least the length of said engine compartment in the longitudinal direction of the machine frame,
a lower end of said steering column being secured to and supported by said support means, and means for securing and supporting a lower end of said radiator to said support means.

5. A riding-type working machine according to claim 4, wherein said steering column comprises a plurality of bent pipes defining said space therebetween.

6. A riding-type working machine according to claim 5, further including frame said steering shaft having a lower end operatively coupled to said steering gearbox, said steering column being mounted on said steering gearbox, said steering gearbox and said steering column being fastened together.

7. A riding-type working machine according to claim 6, said steering column including a dual structure comprising a lower flat member, a plurality of bolt members having lower ends fixed to said machine frame and extending through said lower flat member, an upper flat member interconnecting upper ends of at least two of said bolt members, and support pipes interposed between said upper and lower flat members, said bolt members extending through said support pipes, respectively, at least two of said pipes having a first portion extending substantially horizontally at an upper portion of said steering shaft, said first portion serving as an upper section of said steering column, a second portion extending substantially downwardly from a distal end of said first portion, said second portion serving as a side section of said steering column, and a third portion extending substantially horizontally from a distal end of said second portion, said third portion serving as a bottom section of said steering column, at least one of said pipes having an inclined portion extending obliquely out of physical interference with said steering shaft from the upper portion of said steering shaft, said inclined portion serving as a rear portion of said side section of said steering column, and a lower inclined portion extending obliquely rearwardly from a distal end of said inclined portion, said third portion and said lower inclined portion having distal ends joined to sides of said support pipes of said dual structure.

8. A riding-type working machine according to claim 7, wherein said steering gearbox is of a substantially flat shape and serves as said lower flat member.

9. A riding-type working machine according to claim 8, wherein said radiator and said cooling fan are disposed between the rear portion of the side section of said steering column and a front portion of the side section of said steering column.

10. A riding-type working machine according to claim 9, wherein said radiator is joined to said upper and bottom sections of said steering column.

* * * * *